United States Patent
Parikh et al.

(10) Patent No.: US 12,153,951 B2
(45) Date of Patent: Nov. 26, 2024

(54) SYSTEM AND METHOD FOR MANAGING WORKLOAD OF AN APPLICATION IN A CLOUD COMPUTING ENVIRONMENT

(71) Applicant: Platform9, Inc., San Jose, CA (US)

(72) Inventors: Roopak Parikh, San Jose, CA (US); Madhura Maskasky, Los Altos, CA (US); Pushkar Acharya, San Jose, CA (US); Mayuresh Kulakarni, Pune (IN); Ashutosh Tiwari, Pune (IN); Anirudh Pokala, Telangana (IN); Omkar Deshpande, Maharashtra (IN); Shubham Agarwal, Rajasthan (IN)

(73) Assignee: Platform9, Inc., San Jose, CA (US)

( * ) Notice: Subject to any disclaimer, the term of this patent is extended or adjusted under 35 U.S.C. 154(b) by 0 days.

(21) Appl. No.: 18/429,946

(22) Filed: Feb. 1, 2024

(65) Prior Publication Data
US 2024/0220307 A1 Jul. 4, 2024

(51) Int. Cl.
*G06F 9/455* (2018.01)

(52) U.S. Cl.
CPC .......... *G06F 9/45558* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 10,721,290 B2 | 7/2020 | Gill et al. | |
| 11,372,686 B1* | 6/2022 | Vig | G06F 9/5072 |
| 11,656,912 B1* | 5/2023 | Burgin | G06F 9/5022 |
| | | | 718/105 |
| 11,853,909 B1* | 12/2023 | O'Neil | G06Q 10/063 |
| 2011/0078303 A1* | 3/2011 | Li | H04L 67/1031 |
| | | | 718/1 |
| 2015/0089062 A1 | 3/2015 | Reiter | |
| 2018/0048716 A1* | 2/2018 | Madhayyan | G06F 9/45558 |
| 2021/0117307 A1* | 4/2021 | MacNamara | G06F 11/302 |
| 2021/0349749 A1 | 11/2021 | Guha | |
| 2022/0321396 A1* | 10/2022 | Singh | H04L 67/125 |
| 2024/0031289 A1* | 1/2024 | Balakrishnan | H04L 12/4633 |

* cited by examiner

*Primary Examiner* — Wynuel S Aquino
(74) *Attorney, Agent, or Firm* — Shumaker, Loop & Kendrick, LLP

(57) ABSTRACT

A system and a method for managing workload of an application in a cloud infrastructure is disclosed. The cloud infrastructure may include an existing cloud infrastructure (ECI) and an Elastic Machine Pool Infrastructure (EMPI). The method may include connecting the EMPI to the ECI by configuring cloud control manager of the ECI. Further, the method may include receiving the workload from the application running on the cloud infrastructure. The workload may be allocated to an Elastic Virtual Machine (EVM) hosted by the EMPI or a VM hosted by the ECI based on at least one of an EMP profile of the application, status of the EVM, and workload characteristics of the EVM. Further, the one or more bare metal servers and the one or more EVMs may be managed based on at least one of the workload characteristics and the status of the EVM.

16 Claims, 7 Drawing Sheets

SYSTEM AND METHOD FOR MANAGING WORKLOAD OF AN APPLICATION IN A CLOUD COMPUTING ENVIRONMENT

PRIORITY INFORMATION

The present application claims priority from IN Patent application no: 202311071042 filed on Oct. 18, 2023.

TECHNICAL FIELD

The present subject matter described herein, in general, relates to managing workload of an application in a cloud computing environment and, more particularly, to a system and a method for dynamically allocating and optimizing computing resources to efficiently handle varying demands and requirements of the application.

BACKGROUND

In recent years, cloud computing has emerged as a paradigm shift, providing deployment of applications and services with unprecedented levels of flexibility, scalability, and accessibility. The computing environment on the cloud provides a virtualized infrastructure where applications can be provisioned, deployed, and operated without the limitations of physical hardware. Despite the numerous advantages of cloud computing, managing the load of applications in these dynamic and ever-changing environments presents unique challenges.

Allocating a fixed set of computing resources to an application, independent of its actual demand, is a prevalent practice in conventional approaches to workload management. Such fixed allocation of computing resources results in inefficient resource utilization, leading to either underutilized resources or resource shortages during peak load periods. Moreover, manually configuring and altering resource allocations for various applications can be time-consuming, error-prone, and difficult to effectively optimize.

Furthermore, as applications become more diverse and complex, with varying resource requirements and fluctuating tasks, the demand for dynamic and automated workload management solutions grows.

SUMMARY

Before the present system(s) and method(s) are described, it is to be understood that this application is not limited to the particular system(s), and methodologies described, as there can be multiple possible embodiments that are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for managing workload of an application in a cloud computing environment. This summary is not intended to identify essential features of the claimed subject matter, nor is it intended for use in determining or limiting the scope of the claimed subject matter.

In one implementation, a method for managing workload of an application in a cloud computing environment is disclosed. The cloud computing environment may comprise an existing cloud infrastructure (ECI) and an Elastic Machine Pool Infrastructure (EMPI). The method may comprise receiving cloud service data from the EC. The ECI may comprise a storage system, one or more bare metal servers, and a network interface, a storage interface, a cloud control manager, and one or more virtual machines (VMs). Further, the method may comprise configuring the cloud control manager to connect an Elastic Machine Pool Infrastructure (EMPI) to the existing cloud infrastructure. The cloud control manager may be configured to communicate with the network interface and the storage interface in order to connect the EMPI to the EC. The EMPI may comprise an admission controller, an orchestrator, a rebalancer, and an auto-scaler. Furthermore, the workload may be received from the application running on the cloud computing environment. The orchestrator may create one or more Elastic Virtual Machines (EVMs) in an Elastic Machine Pool (EMP) based on the workload. Subsequently, the workload may be allocated to an EVM of the one or more EVMs. The workload may be allocated based on at least one of an EMP profile of the application, status of the EVM, and workload characteristics of the EVM. The workload may be allocated by the admission controller. Further, the one or more bare metal servers and the one or more EVMs may be managed based on at least one of the workload characteristics and the status of the EVM. In an embodiment, the EMP infrastructure may be connected to the existing cloud infrastructure. In one aspect, the aforementioned method for managing workload of an application in a cloud computing environment may be performed by a processor using programmed instructions stored in a memory.

In another implementation, a non-transitory computer readable medium embodying a computer program executable in a computing device for managing workload of an application in a cloud computing environment is disclosed. The program may comprise a program code receiving cloud service data from the EC. The ECI may comprise a storage system, one or more bare metal servers, and a network interface, a storage interface, a cloud control manager, and one or more virtual machines (VMs). Further, the program may comprise a program code for configuring the cloud control manager to connect an Elastic Machine Pool Infrastructure (EMPI) to the existing cloud infrastructure. The cloud control manager may be configured to communicate with the network interface and the storage interface in order to connect the EMPI to the EC. The EMPI may comprise an admission controller, an orchestrator, a rebalancer, and an auto-scaler. The program may comprise a program code for receiving the workload from the application running on the cloud computing environment. Subsequently, the program may comprise a program code for creating one or more Elastic Virtual Machines (EVMs), based on the workload, using the orchestrator. Further, the program may comprise a program code for allocating the workload to an EVM of the one or more EVMs. The workload may be allocated based on at least one of an EMP profile of the application, status of the EVM, and workload characteristics of the EVM, wherein the workload is allocated by the admission controller. Further, the program may comprise a program code for managing the one or more bare metal servers and the one or more EVMs based on at least one of the workload characteristics and the status of the EVM.

BRIEF DESCRIPTION OF THE DRAWINGS

The foregoing detailed description of embodiments is better understood when read in conjunction with the appended drawings. For the purpose of illustrating the present subject matter, an example of a construction of the present subject matter is provided as figures, however, the invention is not limited to the specific method and system for managing workload of an application in a cloud computing environment disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "configuring," "allocating," "managing," "monitoring," "modifying," "creating," and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of the ordinary skill in the art will readily recognize that the present disclosure is not intended to be limited to the embodiments described but is to be accorded the widest scope consistent with the principles and features described herein.

Figure 1:
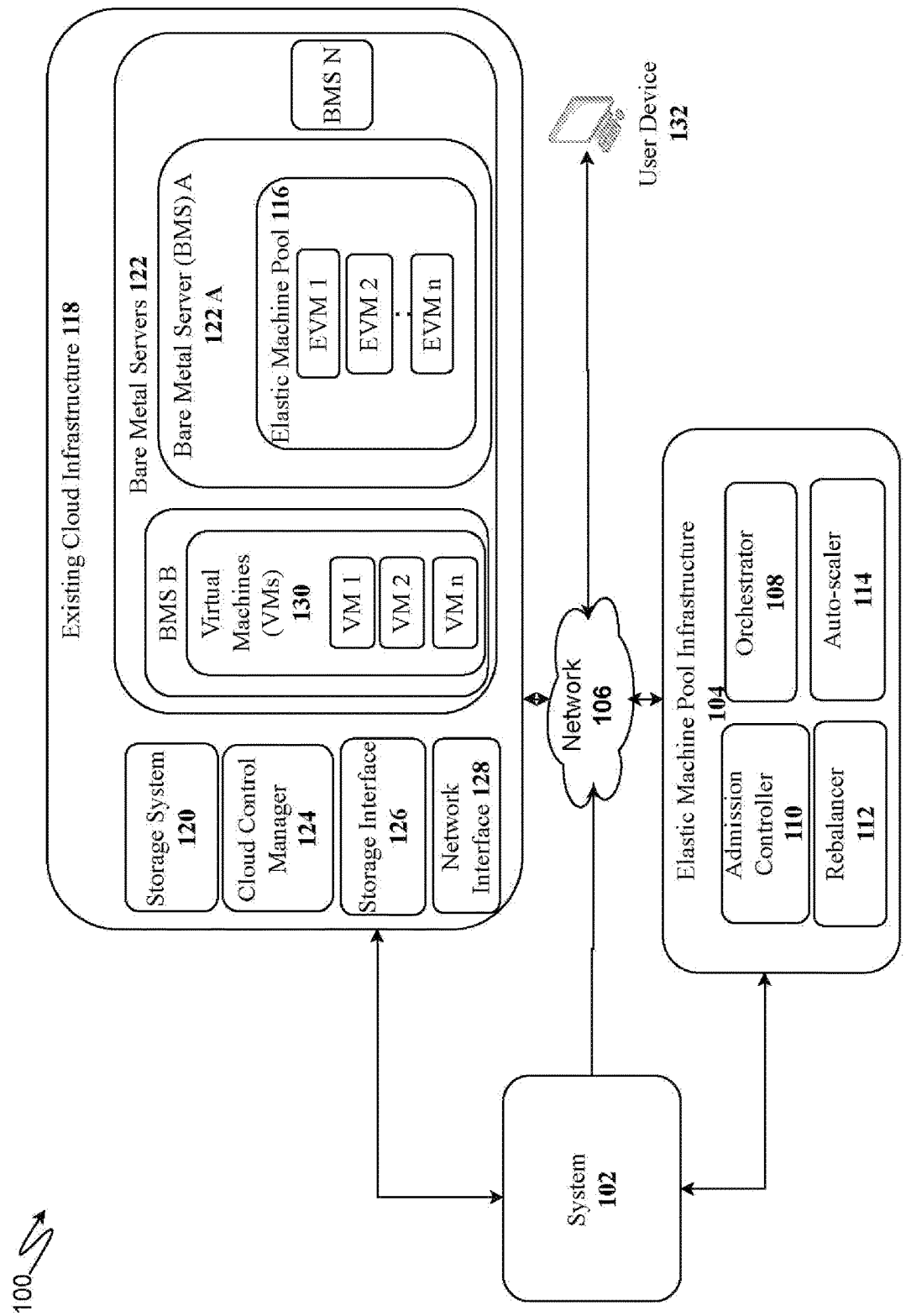
FIG. 1 illustrates a network implementation for managing workload of an application in a cloud computing environment, in accordance with an embodiment of the present subject matter.

The present subject matter discloses a method and a system for managing workload of an application in a cloud computing environment. FIG. 1 illustrates a network implementation 100 of the system 102 for managing workload of an application in a cloud computing environment. The system 102 receives cloud service data from an existing cloud infrastructure (ECI) 118. The cloud service data may include cloud service provider information and subscription information. The cloud service provider information may include Application Programming Interface (API) credentials and access permissions to interact with and provision resources. The subscription information may include amount of resources available, security policies, and access permissions.

In an embodiment, the ECI 118 may comprise a storage system 120, one or more bare metal servers 122, a network interface 128, a storage interface, a cloud control manager, and one or more Virtual Machines (VMs). In an embodiment, the existing cloud infrastructure 118 may be set up in the cloud computing environment to support the application running on the cloud computing environment.

For instance, an organization utilizes cloud computing environment resources provided by cloud service provider to run their application. The company leases a particular amount of cloud computing resources that will form the cloud computing environment for the company.

The cloud computing resources encompass various components that work together to support the application. The collection of these resources may be referred to as the "existing cloud infrastructure." This infrastructure may include multiple types of resources such as:

Virtual Machines (VMs): The VMs are like digital versions of physical computers. Each VM provides computing power, memory, and storage, essential for running the application's code and processing customer requests.

Storage Systems: The application requires storage to store various types of data, such as customer profiles, product information, and transaction history. The cloud service provider offers storage services such as file storage (like storing images) and database storage (like storing structured data).

Networking Interfaces: To ensure the application is accessible to users all over the world, the organization requires a network infrastructure. The cloud service provider offers networking services that allow the application to communicate with users' devices, process data, and respond to requests.

Load Balancers or Rebalancers: As the application gains popularity, traffic to the application can fluctuate. To distribute this traffic evenly across multiple VMs and ensure none of the VMs get overwhelmed, the organization may use load balancers provided by the cloud service. Load balancers help manage incoming requests efficiently.

Auto-Scaling components: To adapt to varying demands of users an auto-scaling feature is provided. When the number of users increases suddenly (like during a big sale), the cloud computing environment may automatically create additional VMs to handle the load. The extra VMs are scaled down to save resources when the rush subsides.

Security and Identity Services: The cloud service provider's security and identity services help manage user authentication, encryption, and safeguard against cyber threats.

The applications using the cloud computing resources are allocated some part of total cloud computing resources. The resources are vital for the proper functioning of each application. An issue may arise when an application experiences a sudden surge in user demand, depleting all the allocated resources.

Traditionally, when such an overload occurs, additional Virtual Machines (VMs), storage resources, and other infrastructure elements are allocated to meet the increased demand. However, this conventional approach has inherent inefficiencies and cost implications. When an application faces an overload, it is a common practice to allocate additional resources such as VMs and storage independently. Even though there might be free or underutilized resources within the existing cloud infrastructure 118. This results in overallocation of resources, with some being underutilized while others are fully utilized. Further, the overallocation of resources not only leads to reduced overall efficiency of resource utilization but also incurs unnecessary costs for an organization.

In order to overcome the above problem, the present system 102 may configure the cloud control manager (CCM) 124 to connect an Elastic Machine Pool Infrastructure (EMPI) 104 to the ECI 118. The EMPI 104 may comprise an admission controller 110, an orchestrator 108, a rebalancer 112, and an auto-scaler 114. The EMPI 104 may be set up by the system 102 using resources from the one or more bare metal servers 122 of the ECI 118. The system 102 may use the orchestrator 108 to create the one or more EVMs (EVM 1, EVM 2, EVM n) in an Elastic machine Pool (EMP) 116 on the one or more bare metal servers 122. The orchestrator 108 may first check compatibility of the cloud computing environment to support elastic virtual machines (EVMs). Further, the orchestrator 108 may identify a bare metal server 122 A to create elastic virtual machines (EVMs) on the bare metal server 122 A. The orchestrator 108 may provision resources on the bare metal server 122 A for the elastic virtual machines. Further, the orchestrator 108 may configure the bare metal server based on one or more parameters including operating system of the application, network settings, and storage requirements of the application that will be sending workload to the elastic virtual machines.

To obtain resources for handling incoming workload from the application, the system 102 may configure the CCM 124 to request a persistent volume (PV) from the storage interface 126 of the existing cloud infrastructure 118 to provision resources for the EVMs. In an embodiment, the storage interface 126 may comprise a controller and a node agent. The controller manages the process of obtaining and provisioning persistent volumes. The controller may comprise a storage driver, a provisioner, and an attacher. Further, the node agent is a component of the storage interface 126 that runs on a plurality of bare metal servers 122, the one or more VMs 130, and the one or more EVMs. The node agent may enable seamless communication and coordination between the one or more nodes (nodes include bare metal servers 122, VMs 130, and EVMs) and the storage system 120. The node agent acts as a bridge between the plurality of bare metal servers 122 and the one or more nodes and the storage system 120. The storage system 120 may have a reservoir of resources on the plurality of bare metal servers 122.

The request for a persistent volume is called Persistent Volume Claim (PVC). The controller may access APIs to manage the one or more nodes (VMs and EVMs). The controller may comprise a storage driver, a provisioner, and an attacher. The storage driver may manage storage-related operations. Further, the provisioner may handle the provisioning of resources, possibly using cloud service provider APIs. The attacher may attach a unique node ID to the resources.

Further to receiving a PVC, the provisioner may command the storage driver to provision resources for the one or more nodes using the cloud service provider software development kit and APIs. A node id is attached to the resources using the attacher and the cloud computing environment Application Programming Interfaces (APIs). The node id is used to assign the resources to a particular node when the node requests the resources. Further, the storage driver is used to attach the volume to the node based on the node id.

The system 102 may configure the CCM 124 to connect the storage interface 126 of the existing cloud infrastructure 118 to the EMPI 104. The CCM 124 transmits commands to the storage interface 126 to receive provisioning requests from an EVM and allocating resources to the EVM.

When the Persistent Volume Claim (PVC) is received, the storage interface 126 attaches the persistent volume created on the bare metal server to the EVM. Further, the CCM 124 returns path of the EVM requesting resources along with a node ID of the EVM for the path request made by the storage interface 126.

The CCM 124 further communicates with the network interface 128 to connect the EMPI 104 with the existing cloud infrastructure 118. The CCM 124 may transmit an Internet Protocol (IP) address allocation request from an EVM to the network interface 128. The IP allocation request may be transmitted as an object. The network interface 128 may comprise an IP Address Management Daemon (IP-AMD). Further, the IPAMD may watch for an IP address allocation request. Upon receiving the IP allocation request, the IPAMD may assign an IP address for the IP address allocation object. The IP address allocation object is transmitted to the EVM using routing tables set up by the CCM 124. The CCM 124 may configure routing tables to establish the correct paths for data transmission between the EVMs and other components. The routing tables define a routing logic for data packets within the network. Further, the CCM 124 may adjust or modify one or more communication policies to permit and regulate communication flow between the EVMs and other resources on the existing cloud infrastructure 118. The communication policies ensure that data can be securely exchanged according to predefined rules and permissions.

Further, the cloud control manager may perform one or more activities including at least one of assigning node identifiers (IDs) for the one or more EVMs, communicating with the one or more EVMs to monitor the status of the one or more EVMs and monitoring status of a pod running on the one or more EVMs.

In an embodiment, the CCM 124 may assign a unique node ID to an EVM of the one or more EVMs. The node ID is essential for distinguishing and tracking individual EVM instances within the Elastic Machine Pool (EMP). Further the monitoring of the EVMs is facilitated through communication between the CCM 124 and the EVMs. A continuous monitoring of EVMs encompasses the real-time assessment of EVM status, ensuring optimal performance and resource utilization. Furthermore, multiple instances of workloads, known as pods, may be orchestrated to streamline the workload management. The cloud control manager may monitor the status of the pods. This provides a granular view of workload distribution and performance on the EVMs. A pod is the smallest deployable unit in a containerized application and may contain one or more containers. Each pod is designed to execute a specific task or part of an application. A container may be a lightweight, standalone, and executable software package that comprises a software, including the code, runtime, system tools, system libraries, and settings.

The CCM 124 may be configured by updating the APIs of the cloud service provider by adding one or more new objects related to the EVMs and defining a schema for the one or more new objects. The one or more objects may refer to new data structures or components added to the cloud control manager's APIs to extend CCM 124's functionality and enable the CCM 124 to manage Elastic Virtual Machines (EVMs) and associated resources in EMP infrastructure. The one or more objects may be developed to manage the EVMs and monitor the EVMs. The one or more objects may include pods running on the EVMs, resources utilized by the pods, bare metal servers 122 hosting the one or more EVMs, and the like.

In an embodiment, the system 102 may receive workload from the application. Further to connecting the EMPI 104 with the existing cloud infrastructure (ECI) 118, the system 102 may allocate the workload to one or more nodes. The one or more nodes may include at least one of the one or more VMs from the existing cloud infrastructure 118 and the one or more EVMs from the EMP pool. The workload may be allocated based on an EMP profile of the application, status of the one or more nodes, and workload characteristics. The EMP profile may comprise policies and a set of rules related to the workload characteristics. The policies and the set of rules may help in identifying a node from one or more nodes for the workload. The workload characteristics may include at least one of resource requirements of the workload, source of the workload, input/output patterns of the workload, latency requirements, transactions per second, data access patterns, peak load, and the like.

Further, the EMP profile may have a set of combinations of the workload characteristics and corresponding allocation instructions. The allocation instructions may comprise the one or more nodes to which the workload is allocated.

For example, a workload having high latency requirement may be allocated to the one or more VMs present in the existing cloud infrastructure 118. In another example, a workload having high resource requirements may be allocated to the one or more EVMs hosted on the one or more bare metal servers 122 by the EMPI 104.

To allocate the workload to the one or more nodes, the system 102 may first allocate the workload to one or more pods using the container management service of the cloud computing environment such as Kubernetes. Further, the system 102 may define pod characteristics based on the workload characteristics. The pod characteristics may include one or more of number of pod replicas, a pod template, pod health, resource requirements, and container images. The number of pod replicas may be determined based on the workload characteristics for load distribution, scalability and avoiding downtime. The pod template may be used to replicate pods efficiently. The pod health refers to usability of the pod. The pod health may be determined based on at least one of readiness, liveness, resource utilization, application specific metrics, startup, and initialization. The pod health may be monitored to monitor status of the one or more pods.

Further, the one or more pods may be allocated to the one or more nodes based on at least one of the status of the one or more nodes, the status of the one or more pods, one or more pod characteristics, and pod scheduling data. The status of the one or more nodes is monitored using the cloud control manager. The status of the one or more nodes may be at least one of ready, not ready, pending, running, succeeded, failed, unknown, terminating and terminated. In an alternate embodiment, the status of the one or more nodes is continuously monitored using the cloud control manager.

Figure 4:
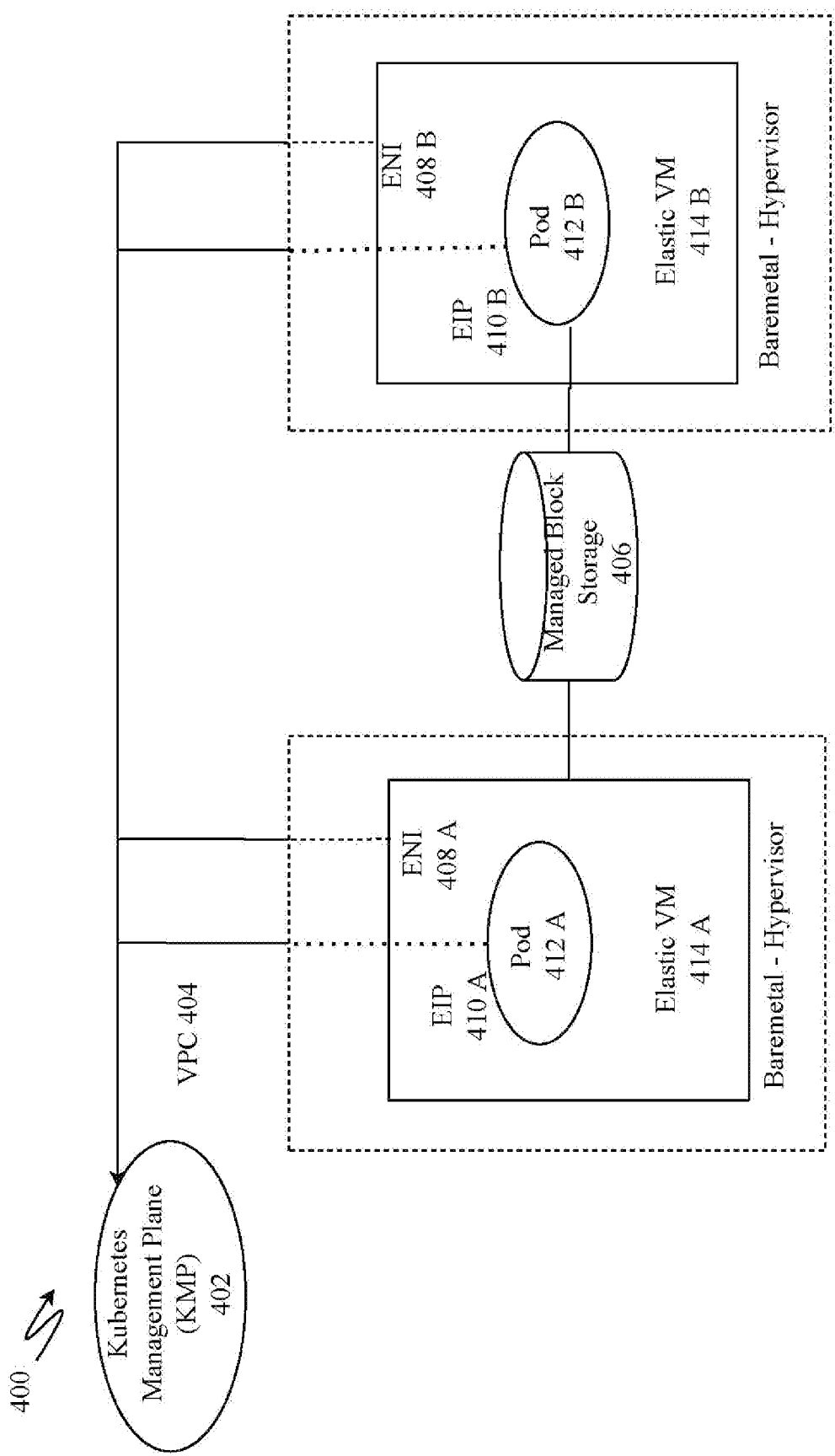
FIG. 4 illustrates a block diagram for connecting Elastic Virtual Machines in a Kubernetes cluster of a cloud computing environment, in accordance with an embodiment of the present subject matter.

FIG. 4 illustrates the allocation of pods 412A and 412 B on the one or more nodes including Elastic VMs 414A and 414 B. As seen in the FIG. 4, The EVMs 414A and 414B are hosted on a bare metal server. Further, the pods 412A and 412B are allocated to the EVMs.

A pod is in the "Pending" state when the pod has been scheduled to run on a node, but the necessary resources (CPU, memory) have not been allocated yet. The pod may be pending when the at least one of the bare metal servers 122, EVMs, and VMs lacks enough resources to start the pod. Further, the "Running" state indicates that the pod is actively running on a node. All the containers within the pod are also running. A pod is in the "Succeeded" state when all of the pod's containers have been executed successfully and then terminated. This is often the case for batch jobs or one-time tasks. The "Failed" state means that all containers in the pod have terminated, and at least one of them has terminated with an error. This indicates a problem with the pod's execution.

When the status of a pod cannot be determined, the pod is in the "Unknown" state. This can occur due to communication issues with a cluster (comprising bare metal servers 122, VMs 130, and EVMs) or if the pod's status information is unavailable. A pod enters the "Terminating" state when the pod is in the process of being shut down. The terminating state means that the pod's containers are being terminated, and the pod will eventually move to a "Terminated" state when all containers have stopped. The "Terminated" state signifies that all containers in the pod have finished executing, and the pod is no longer running. The terminated state may happen after successful execution or due to an error.

The status of the one or more nodes may be determined based on multiple parameters including available resources, responsiveness, connectivity, runtime health, and the like. The status of the one or more pods may be at least one of pending, running, succeeded, failed, and unknown. The pod scheduling data includes at least one of node affinity, pod tolerations, and pod priorities. The node affinity refers to a reference for a node from the one or more nodes. The node affinity may be determined based on the EMP profile. The pod tolerations may refer to types of nodes that the pod may be scheduled on. The types of nodes may refer to health of the nodes. The pod priorities may indicate an order of the pods being scheduled.

Furthermore, the system 102 may manage the one or more bare metal servers 122 and the one or more EVMs based on at least one of the workload characteristics and the status of the one or more nodes. The system 102 may use an auto-scaler 114 or a rebalancer 112 to manage the one or more bare metal servers 122 and the one or more EVMs. The auto-scaler 114 may monitor the status of the one or more pods and the one or more nodes.

Further, the auto-scaler 114 may create a new node based on the status of the one or more pods and the status of the one or more nodes. For example, the auto-scaler 114 may detect that a pod has a pending status and that all the nodes from the one or more nodes have a not ready status. In the example, the auto-scaler 114 may then create a new EVM on the bare metal server by provisioning resources from at least one of the bare metal servers 122 and the one or more EVMs having the status not ready. The auto-scaler 114 may extract resources from the one or more EVMs if the one or more EVMs have unutilized resources.

The extraction of the resources refers to reallocating or reassigning computing resources from existing resources that are currently marked as "not ready" to create a new Elastic Virtual Machine (EVM) to handle pending workloads. It may be noted that the system 102 continuously monitors the status of the pods (workload instances) and the nodes (VMs and existing EVMs) in the cloud computing environment.

When the auto-scaler 114 detects that one or more pods have a "pending" status, it means that the one or more pods are waiting for resources to become available for execution. Simultaneously, if all the nodes in the infrastructure have a "not ready" status, it indicates that the existing resources are currently unable to handle new workloads. In such scenarios, the auto-scaler 114 addresses the resource shortage by creating a new Elastic Virtual Machine (EVM) on one of the bare metal servers 122. To create the new EVM, the auto-scaler 114 may provision resources from either the bare metal servers 122 or the existing EVMs that have the "not ready" status. Further, the resource extraction means that the auto-scaler 114 reallocates a portion of the computing resources from the existing "not ready" resources to create the new EVM. These resources can include CPU, memory, storage, and network bandwidth. The auto-scaler 114 performs the reallocation in a way that does not disrupt the existing workloads running on the nodes but ensures that sufficient resources are available to bring the new EVM into operation. The resource extraction process avoids over-allocating by reallocating resources from underutilized or temporarily idle resources (i.e., those with a "not ready" status) to meet the immediate demands of pending workloads.

Further to creating the new node, the system 102 may manage the one or more bare metal servers 122 and the one or more EVMs using the rebalancer 112. The rebalancer 112 may continuously monitor resource availability in the EVMs and the bare metal servers 122. The rebalancer 112 may also continuously monitor the resource utilization of the one or more EVMs and the one or more bare metal servers 122. The rebalancer 112 may monitor the workload allocated to the one or more EVMs on the one or more bare metal servers 122.

Further, the rebalancer 112 may perform one or more rebalancing activities when certain thresholds are exceeded. The thresholds are related to resource availability, resource utilization, and workload allocation on both Elastic Virtual Machines (EVMs) and bare metal servers 122. The rebalancing activities include at least one of creating new bare metal servers 122, migrating the one or more EVMs to the new bare metal servers 122, and resizing the one or more EVMs based on the workload characteristics, the status of the one or more pods, and the status of the one or more EVMs.

In an embodiment, the system 102 may overprovision resources for the EVMs in the EMP infrastructure. In an example and not by way of any limitation, a client may specify overprovisioning criteria, such as doubling the CPU power and increasing memory by 1.5 times for the EVMs. In such scenarios, the system 102 may allocate resources to the EVMs that exceed the client's immediate operational requirements, ensuring the client has additional CPU power and memory capacity available.

Further, the system 102 may use the overprovisioned resources to create new bare metal servers 122. In another embodiment, the system 102 may request resources from the existing cloud infrastructure 118 to create new bare metal servers 122. In another embodiment, the system 102 may leverage third party cloud storage servers to extract the resources required for rebalancing. The rebalancer may command the auto-scaler 114 to create the new bare metal servers 122. The resources include at least one of storage resources, network resources, and processing units.

In one embodiment, the system 102 may overprovision resources for Elastic Virtual Machines (EVMs) within the Elastic Machine Pool (EMP) infrastructure. Overprovisioning means allocating more resources (such as CPU, memory, and storage) to EVMs than they may immediately need. This approach is proactive and aims to prepare for potential workload spikes or fluctuations. It may be noted that the system 102 may determine the amount of resources to be overprovisioned based on at least one of historical workload patterns, predictive analytics, workload characteristics, Service-Level Agreements (SLAs), Buffer for Spikes, Scalability and Elasticity Goals, Resource Cost vs. Performance, Resource Pooling Strategy, and Real-Time Monitoring. The system 102 may analyse historical data on workload patterns, including usage peaks and valleys. The system 102 may also perform the predictive analytics based on the historical data on workload patterns.

Predictive Analytics: Predictive analytics and forecasting techniques can be employed to anticipate future workload demands. This includes considering factors such as seasonal variations, event-driven spikes, or expected growth in user activity.

Workload Characteristics: Different workloads have varying resource requirements. The system 102 takes into account the specific characteristics of the workload it needs to support, such as CPU, memory, and storage demands.

Service-Level Agreements (SLAs): The system 102 considers any SLAs or performance guarantees it needs to meet. Overprovisioning can be a strategy to ensure that SLAs are consistently met, even during periods of high demand.

Buffer for Spikes: Overprovisioning is often used as a buffer to accommodate unexpected spikes in workload. By provisioning more resources than currently needed, the system 102 is better prepared for sudden increases in demand.

Scalability and Elasticity Goals: If the system 102 aims to provide elastic scalability, it may opt for overprovisioning to ensure that resources are readily available when scaling up to handle additional workloads. This is particularly important in cloud environments.

Resource Cost vs. Performance: The decision to overprovision should strike a balance between resource availability and cost-efficiency. Overprovisioning can incur higher operational costs, so the system 102 considers the trade-off between performance and cost.

Resource Pooling Strategy: The system's resource pooling strategy, which may include shared pools of resources, can influence the need for overprovisioning. If resources are shared among multiple applications or services, overprovisioning can provide stability.

Real-Time Monitoring: Continuous monitoring of resource utilization and workload performance helps the system 102 adjust its provisioning strategy in real-time. It may dynamically scale resources up or down as needed.

For migrating the one or more EVMs to another bare metal server, the rebalancer 112 may analyse performance of each bare metal server and each EVM. The performance may be analysed based on the memory usage and the processing unit usage. Further, the rebalancer 112 may migrate the EVMs if the resources in the new bare metal servers 122 can support the migrating EVMs. The system 102 may ensure connection of the EVMs to the storage interface 126, the network interface 128, and the storage system 120 while migrating the EVMs to the new bare metal servers 122 using the orchestrator 108 and the cloud control manager.

The rebalancer 112 may also record node management data including historic data of the EMP infrastructure. The rebalancer 112 may use APIs to record the node management data. The historic data may include past workloads, number of EVMs, number of bare metal servers 122, data related to modification of the bare metal servers 122 and the EVMs. The data related to modification of the bare metal servers 122 and the EVMs may comprise a log of auto-scaling operations and rebalancing activities performed. Further, the node management data may be used to train a machine learning algorithm to improve the rebalancer 112 and the auto-scaler 114.

A machine learning model may be trained to recommend management activities including auto-scaling and rebalancing based on an incoming workload. In an embodiment, the machine learning model may predict workload and recommend the management activities in advance. For example, the node management data comprises a log of the workload and the modifications. For instance, a log comprises dates, workload data, and the type of modifications made to the bare metal servers 122 and the EVMs. The machine learning model may predict workload based on past workload on the dates from a previous year from the log and recommend similar modifications to the bare metal servers 122 and the EVMS in real time. In an embodiment, the log may also comprise feedback including accepted and rejected modifications. The machine learning model may use the feedback to improve recommendations in subsequent iterations by using the feedback as training data.

Considering an example, a cloud computing environment including the EMPI 104 and a number of bare metal servers 122 allocated to run Elastic Virtual Machines (EVMs). For instance, Bare Metal A, which initially comprises EVM 1, EVM 2, EVM 3, EVM 4, and EVM 5.

In the above example, let us assume that EVM 1 is running an application that experiences a sudden spike in resource demand, requiring a significant amount of CPU and memory resources. However, the system 102 faces resource constraints. EVM 2-EVM 5 are already utilizing the allocated resources on Bare Metal A, meaning no additional CPU or memory resources are available on Bare Metal A to satisfy the increased demand at EVM 1. In this situation, the system's rebalancer 112 comes into action. The rebalancer 112 continuously monitors the resource utilization of each EVM and the bare metal servers 122.

The rebalancer 112 determines that EVM 1 requires more resources than are currently available on Bare Metal A. Considering the overall resource status and performance metrics of the bare metal servers 122, the rebalancer 112 migrates the EVM 1 to another bare metal server.

It may be noted that the migration process is executed without any interruption in ongoing operations. A live migration of EVM 1 is from Bare Metal A to another bare metal server is done where it can access the additional CPU and memory resources it needs to address the recent spike in demand.

Referring now to FIG. 1, an implementation of managing workload of an application in a cloud computing environment/cloud infrastructure using the system 102 is illustrated. The system 102 may receive cloud service data from the existing cloud infrastructure 118. Further, the system 102 may configure the Cloud control manager 124 to connect the Elastic machine pool infrastructure 104 with the existing cloud infrastructure 118. The cloud control manager 124 may communicate with the storage interface 126 and the network interface 128 in order to connect the EMPI 104 with the ECI 118. The system 102 may be accessed by a user using the user device 132. The system 102 may be hosted on a remote server such that it can be accessed via a network 106. The ECI 118 further comprises a storage system 120 that may provide memory resources to the Virtual machines (VMs) 130 in the ECI 118 and the Elastic Virtual Machines (EVMs) in the Elastic machine pool 116. The Elastic Machine pool 116 may be hosted on the bare metal servers 122 using the EMPI 104. The EMPI 104 comprises an admission controller 110 to allocate workload among the VMs and the EVMs. The EMPI 104 further comprises an orchestrator 108 used to create the EVMs in the EMP on the bare metal servers 122 by provisioning resources from the bare metal servers 122. In an embodiment, the EVMs may be hosted on one bare metal server 122 A and the VMs may be hosted on another bare metal server 122 B. The network 106 may also facilitate communication between the EMPI 104 and the ECI 118.

The system 102 may exchange data, commands, and requests with the ECI 118, the EMPI 104, and the user device via the network 106. may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In an embodiment, the system 102 may include at least a memory, an input/output (I/O) interface, and a processor coupled to the memory. The at least one processor may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor is configured to fetch and execute computer-readable instructions stored in the memory.

The I/O interface may include a variety of software and hardware interfaces, for example, a web interface, a graphical user interface, and the like. The I/O interface may allow the system 102 to interact with the system administrator directly or through the user device 132. Further, the I/O interface may enable the system 102 to communicate with other computing devices, such as web servers and external data servers (not shown). The I/O interface can facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

The memory may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory may include routines, programs, objects, components, data structures, etc., which perform particular tasks or implement particular abstract data types. The memory may include programs or coded instructions that supplement applications and functions of the system 102. In one embodiment, the memory, amongst other things, serves as a repository for storing data processed, received, and generated by one or more of the programs or the coded instructions.

Figure 2:
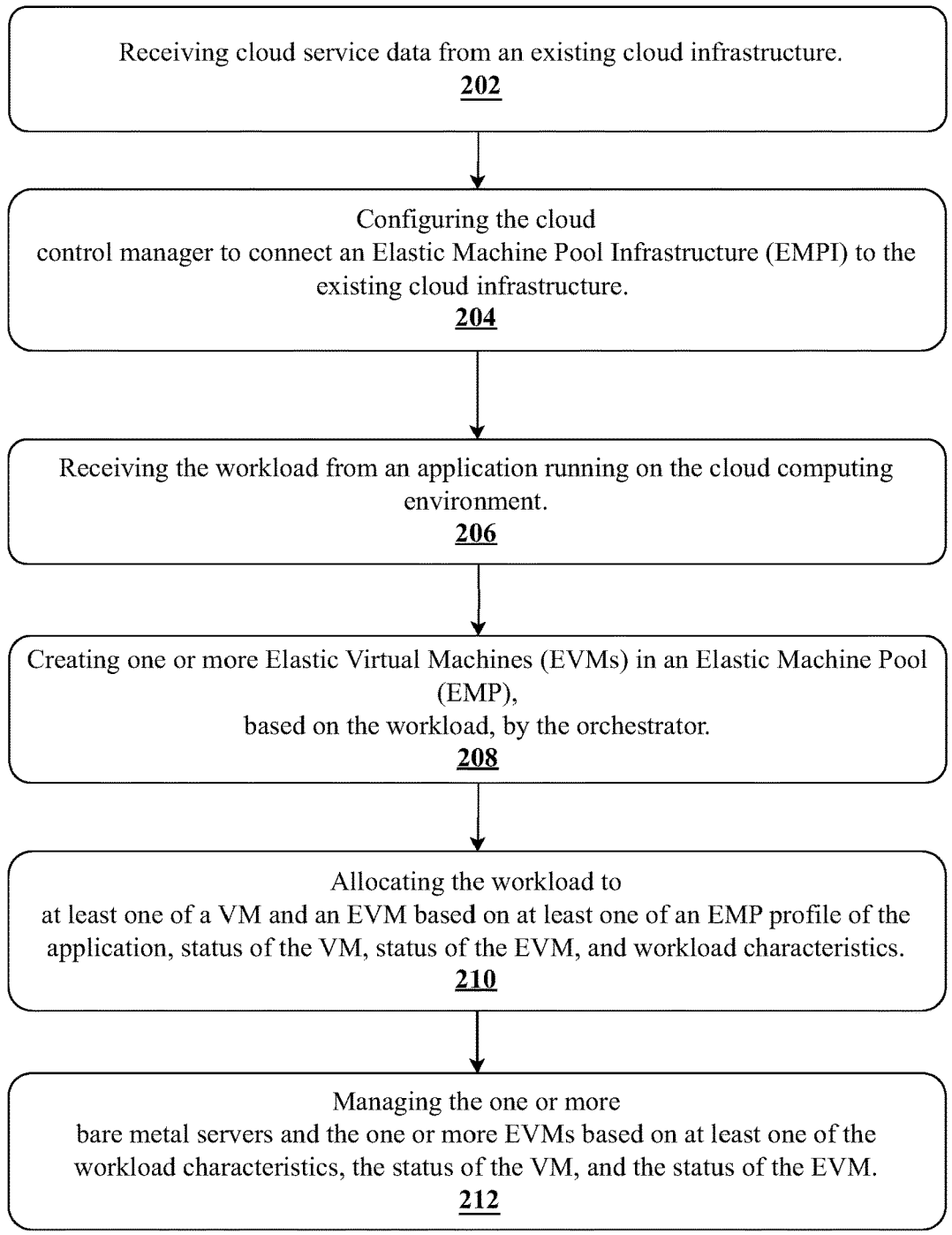
FIG. 2 illustrates a method for managing workload of an application in a cloud computing infrastructure, in accordance with an embodiment of the present subject matter.

Referring now to FIG. 2, a method 200 for managing workload of an application in a cloud infrastructure is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for managing the workload in a cloud computing environment or cloud infrastructure. Additionally, individual blocks may be deleted from the method 200 without departing from the scope of the subject matter described herein. Furthermore, the method 200 for managing the workload of an application in a cloud infrastructure can be implemented in any suitable hardware, software, firmware, or combination thereof. However, for ease of explanation, in the embodiments described below, the method 200 may be considered to be implemented in the above-described system 102.

At block 202, cloud service data including cloud service provider information and subscription information is received from the existing cloud infrastructure 118. The cloud service data is used by the system 102 to set up the EMPI 104. The existing cloud infrastructure (ECI) 118 may comprise a storage system 120, one or more bare metal servers 122, a network interface 128, a storage interface 126, a cloud control manager, and one or more virtual machines (VMs). The EMPI may comprise an admission controller 110, an orchestrator 108, a rebalancer 112, and an auto-scaler 114.

At block 204, the cloud control manager (CCM) 124 is configured to connect the EMPI to the ECI 118 by communicating with the network interface 128 and the storage interface 126. The CCM 124 facilitates transmission of requests and commands between the EMP and the network interface 128 and the storage interface 126.

At block 206, the workload from the application running on the cloud infrastructure may be received using one or more APIs and communication channels. The workload may be referred to as tasks, processes, or computational demands generated by the application running within a cloud infrastructure. The cloud infrastructure may be used to run various applications.

At block 208, the orchestrator 108 may create one or more Elastic Virtual Machines (EVMs) based on the workload. The one or more EVMs may be hosted on the bare metal servers 122 of the existing cloud infrastructure 118.

At block 210, the workload may be allocated to one or more nodes based on workload characteristics, status of the one or more nodes, and an EMP profile of the application. The one or more pod characteristics may include at least one of number of pod replicas, a pod template (a blueprint for creating pods), pod health (whether the pod is currently functioning correctly), resource requirements, and container images. The pod scheduling data may comprise affinity rules, pod tolerations, and pod priorities.

At block 212, the one or more bare metal servers 122, and the one or more EVMs may be managed based on the workload characteristics and the status of the one or more EVMs.

Figure 3:
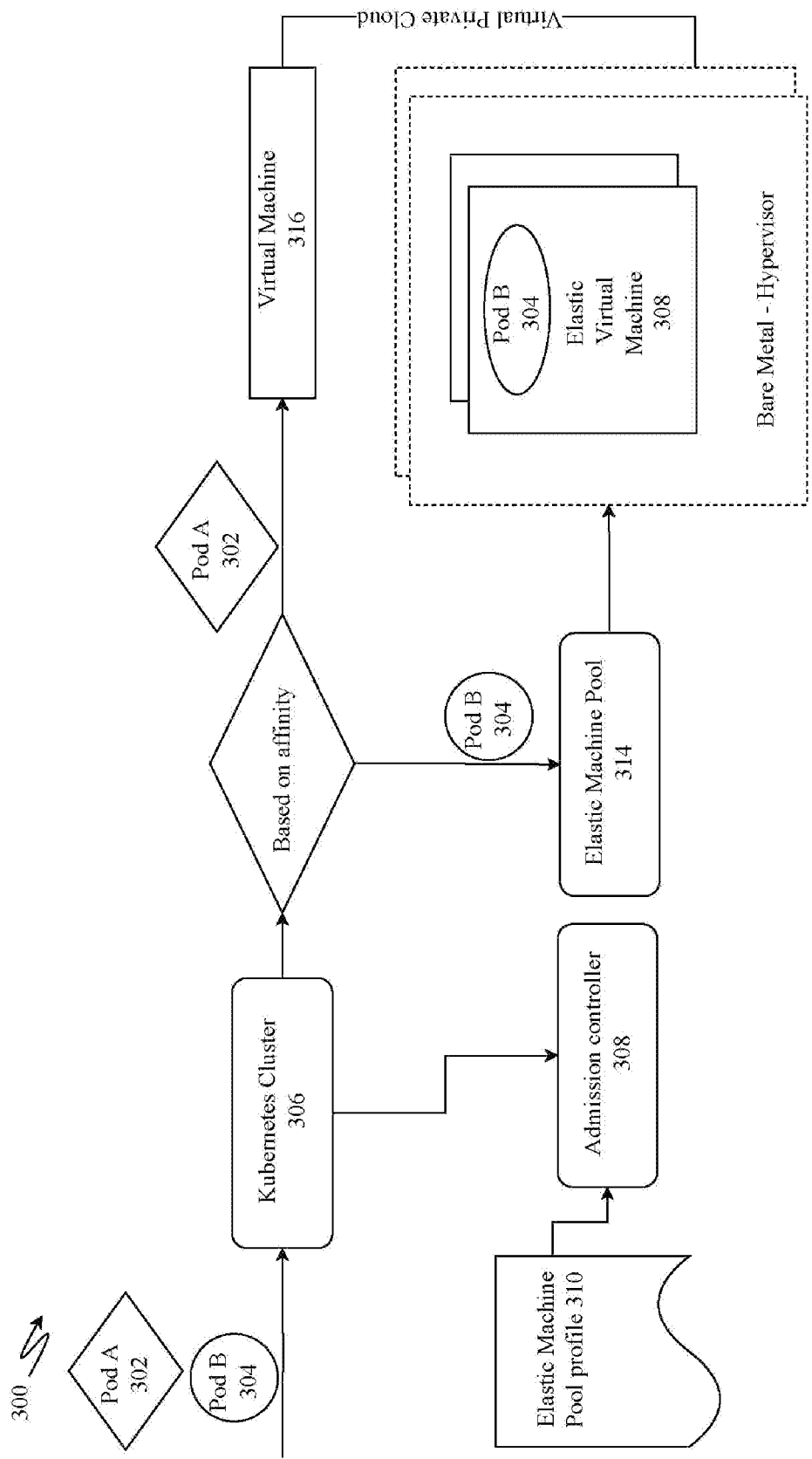
FIG. 3 illustrates the allocation of workload in a cloud computing environment, in accordance with an embodiment of the present subject matter.

FIG. 3 illustrates a process 300 for allocation of workload to the one or more nodes. As seen in the figure, two instances of workload are received from an application—Pod A 302 and Pod B 304. Further, the two instances are sent to the Kubernetes cluster 406 comprising the Virtual Machines 316 and the Elastic Virtual Machines 318. The Elastic Virtual Machines may be hosted on a bare metal server using a bare metal hypervisor. The workload instances are inspected by an admission controller 308 based on an Elastic Machine Pool Profile 310. The admission controller may label the workload instances with an affinity towards a node. The node may include at least one of Virtual Machine 316 and Elastic Virtual Machine 318. Further, the workload instances may be directed towards either the VMs or the EVMs based on the affinity. As seen in the figure, the instance Pod A 302 is directed towards the Virtual Machine 316 and Pod B 304 is directed to the EVM 318. The Virtual Machine and the Elastic Virtual machine may be maintained on a Virtual Private Cloud.

In an example, let us assume "Pod A" is related to development tasks, while "Pod B" is related to testing tasks. This distinction implies that based on the defined rules in the Elastic Machine Pool Profile, the admission controller 308 allocates development-related work to a Virtual Machine 316 and testing-related work to an Elastic Virtual Machine 318.

In a traditional setup, the Kubernetes Management Plane (KMP) 502 interacts with and manages bare metal servers (416 A and 416 B) through network connections. The KMP communicates with the bare metal servers to manage the deployment, scaling, and operation of applications in Kubernetes clusters. The Kubernetes clusters may include one or more Elastic Virtual machines (414A and 414B). The KMP 402 forms a link with the Kubernetes cluster using a Network Interface and assigns an IP address to each component of the Kubernetes Cluster.

As illustrated in FIG. 4 a block diagram 400 of EVMs in a Kubernetes cluster are managed by the Kubernetes control plane. In order to enable the Elastic Virtual Machines 414A and 414B as a part of a Kubernetes cluster, Elastic Network Interface (ENI) (408A and 408B) is used and Elastic Internet Protocol (EIP) addresses 410A and 410B are assigned to pods 412A and 412B running on the EVMs 414A and 414B. The EIPs may be further used to provision storage and resources for the EVMs from the Managed Block storage 406.

The Kubernetes Management Plane (KMP) orchestrates the deployment and management of applications in Kubernetes clusters, including interactions with bare metal servers through network connections. It may be noted that the KMP is a higher-level management layer that can manage one or more Kubernetes clusters. Further, the Kubernetes cluster is the actual computing infrastructure where containerized applications are deployed and managed using Kubernetes.

The Elastic Network Interfaces (ENIs) 408 A and 408 B and Elastic IP addresses (EIPs) 410 A and 410 B enable the KMP 602 to connect directly to Elastic Virtual Machines (414A and 414B) and pods (412 A and 412 B) within the Kubernetes clusters. This connection empowers the KMP to oversee and manage the entire cloud infrastructure, from bare metal servers to the granular components like pods and EVMs, enhancing operational efficiency and control.

A managed block storage 406 represents a type of storage service or storage component within the overall cloud infrastructure. The managed block storage 406 component is responsible for providing persistent storage to the various elements of the Kubernetes cluster, including pods and Elastic Virtual Machines (EVMs).

In FIG. 4, the roles of Elastic Network Interfaces (ENI) 408 A and 408 B and Elastic IP addresses (EIP) 410 A and 410 B are pivotal in enabling the Kubernetes Management Plane (KMP) 402 to connect to pods A and B (412 A and 412 B) and Elastic Virtual Machines (414 A and 414 B). These components introduce a level of flexibility and connectivity that was traditionally lacking when KMP could only connect to bare metal servers.

Figure 5:
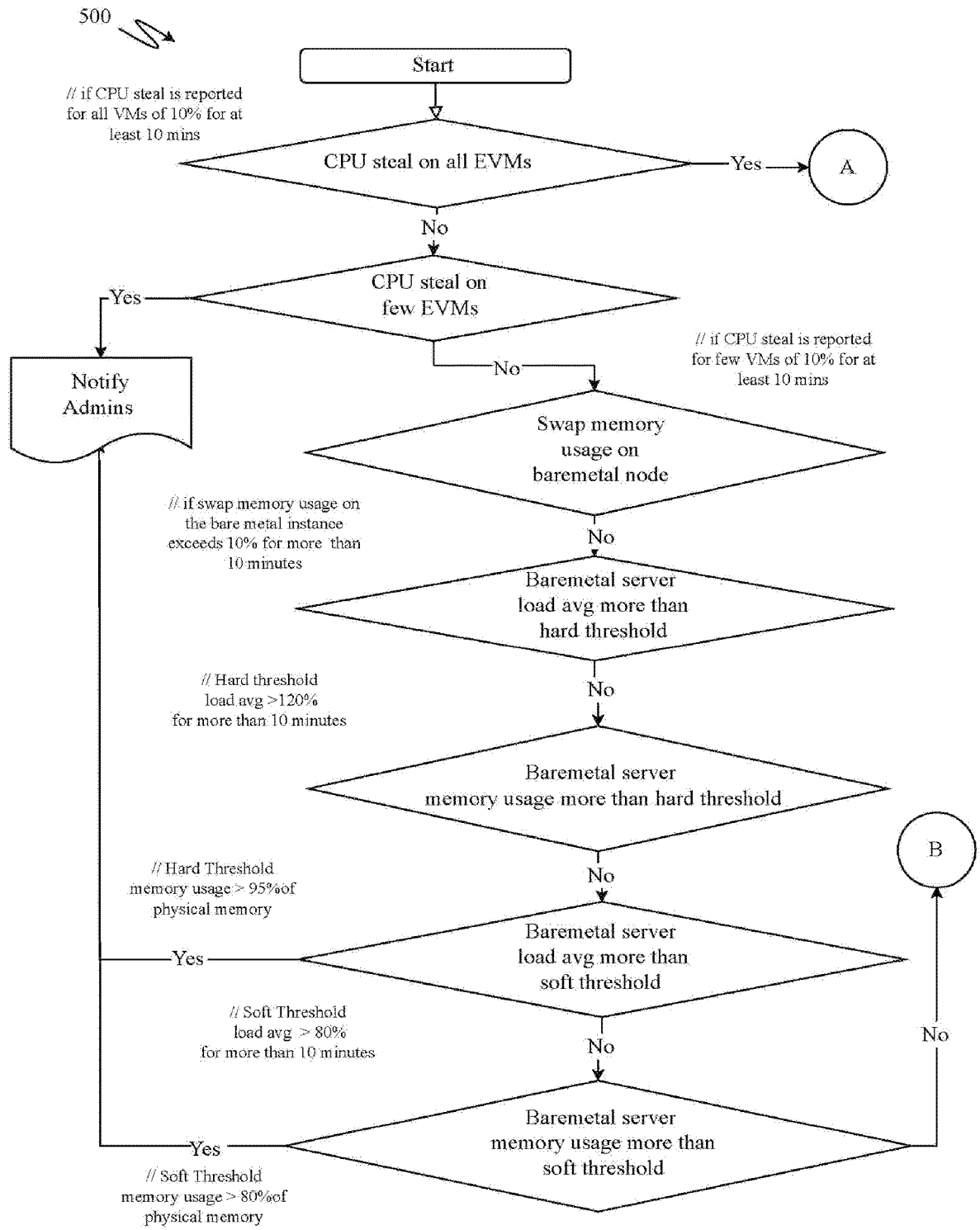
FIG. 5 discloses an exemplary embodiment for managing bare metal servers and Elastic Virtual Machines in a cloud computing environment in accordance with an embodiment of the present subject matter.
Figure 5:
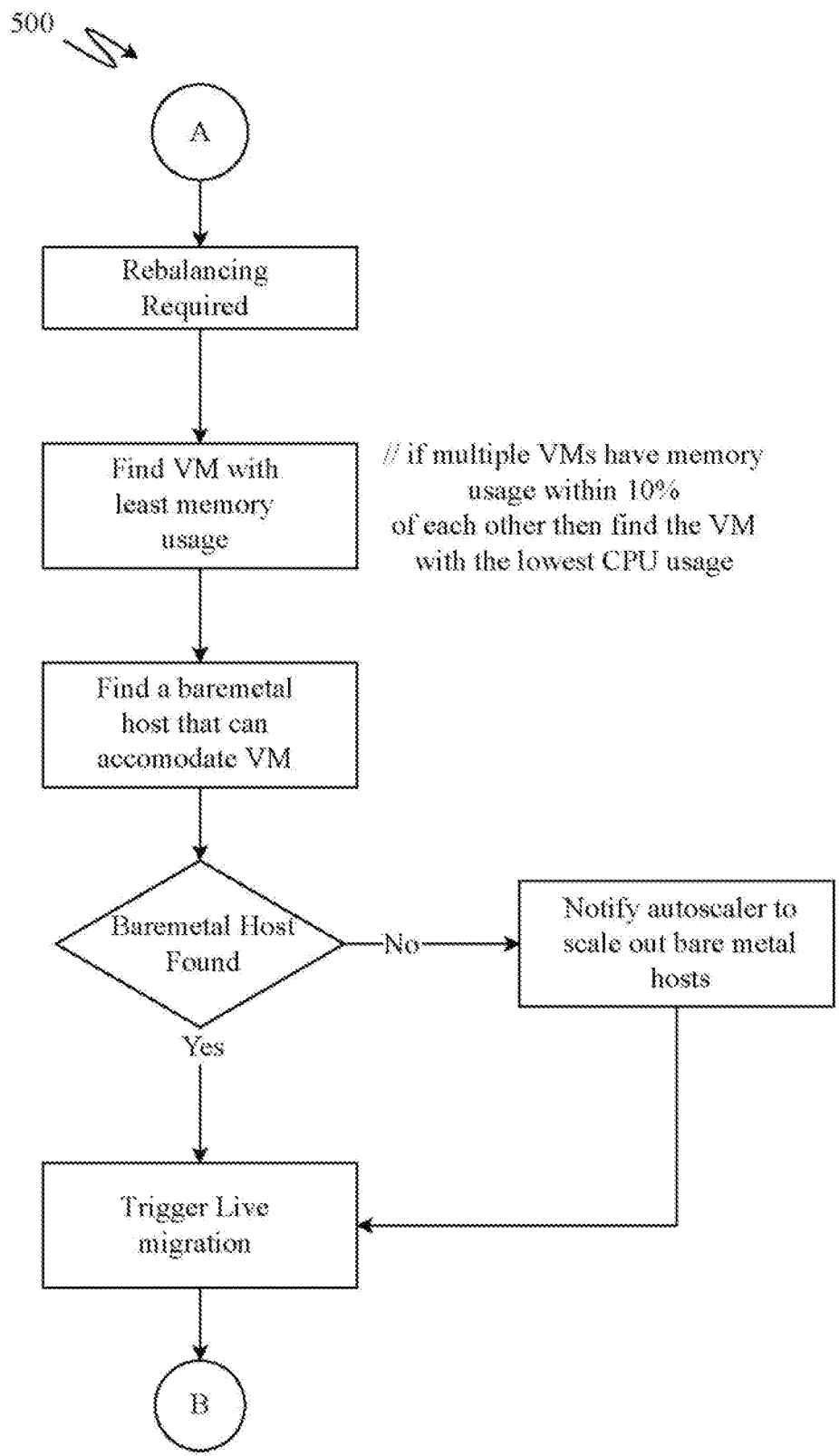
Figure 5:
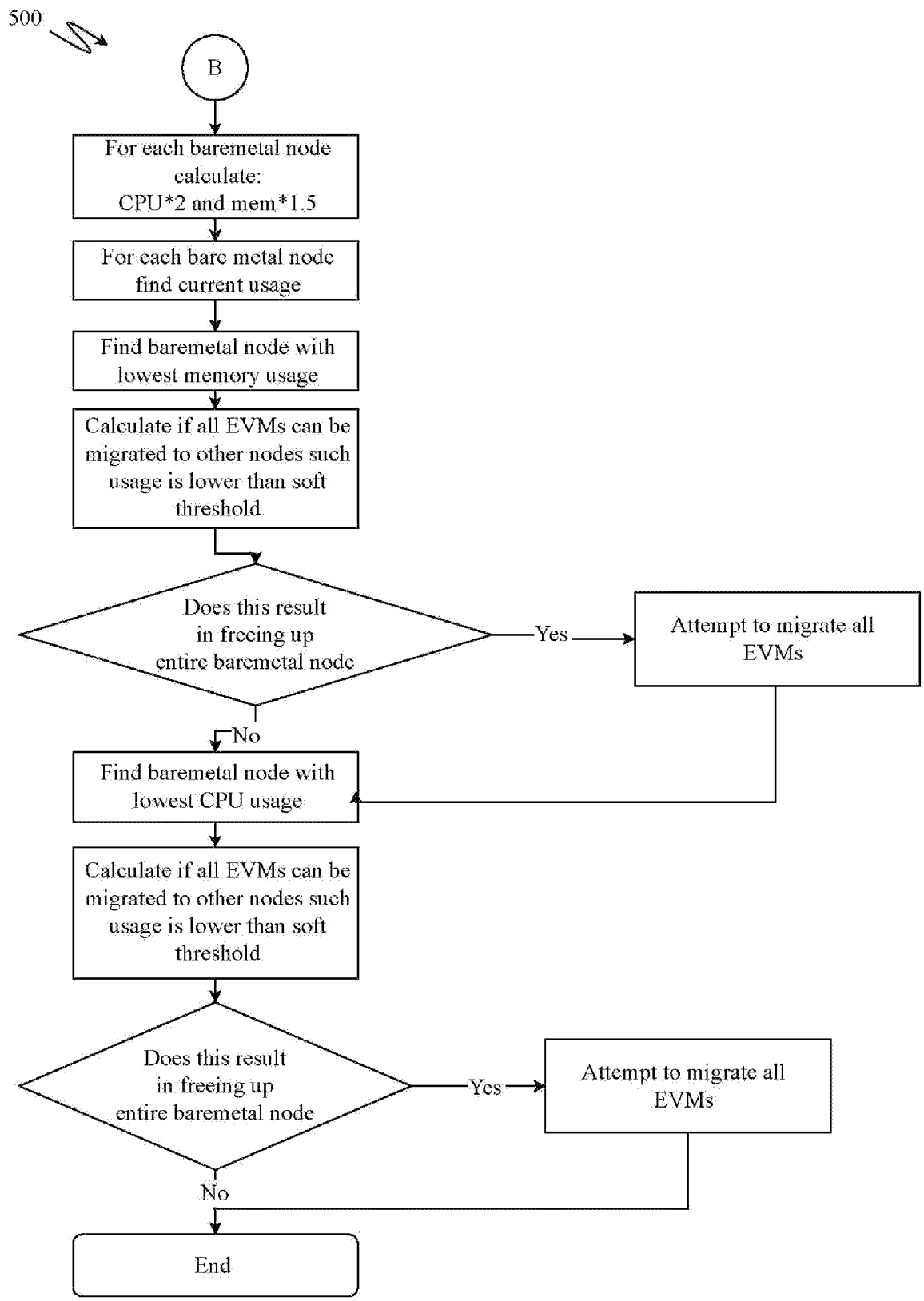

FIG. 5 illustrates an exemplary embodiment 500 for managing bare metal servers and Elastic Virtual Machines in a cloud computing environment using a rebalancer 112 and an auto-scaler 114. A sequence of steps performed by the system 102 is shown in exemplary embodiment 500. The objective of the system 102 is to efficiently allocate resources and balance the workload among various virtual machines (VMs) and bare metal hosts.

A CPU Steal Time, shown in FIG. 5, refers to the amount of time a virtual CPU waits to be executed by the physical CPU on the host due to contention from other virtual CPUs.

When the process begins, it indicates the initiation of the workload management procedure.

At CPU Steal on all EVMs block: The system 102 checks whether CPU steal time reported for all virtual machines (EVMs) is under a predefined threshold. If the condition is met, then the process proceeds to the next step to check if Rebalancing is required.

If the condition is not met, the system 102 may check conditions of one or more other performance parameters including swap memory usage on a bare metal node, bare metal server load average, and bare metal server memory usage. These performance parameters are based on the resource utilization and resource availability in the bare metal servers and the bare metal nodes including the EVMs. Swap memory is a resource that extends processing memory available for a node by using storage memory. Bare metal server load is calculated based on the processing power available in the bare metal server and the processing power utilized by EVMs handling workload on the bare metal server. The bare metal memory usage is based on the memory available in the bare metal and the memory utilized by the EVMs running on the bare metal servers.

Further to checking all the conditions of the performance parameters, the system 102 may either report the states of the performance parameters to the administrator or check if EVMs on the bare metal servers can be migrated to another bare metal server.

Subsequently when Rebalancing Required is 'Yes': If the system 102 identifies high resource utilization that requires rebalancing for optimal performance, it advances to this step. Rebalancing involves redistributing VMs and workloads to alleviate resource bottlenecks. When the rebalancing required step is reached, the system 102 finds an EVM with least memory usage. Further, the system 102 finds a bare metal server that may be able to host the EVM with the least memory usage. If a bare metal host is found, migration of the EVM is triggered. Migration involves moving a running VM from one physical host to another with minimal downtime. If a bare metal server is not found, auto-scaler 114 is triggered to provide more resources from the bare metal server to an EVM that has high resource utilization.

When migration of an EVM is triggered, performance metrics of each EVM on the bare metal servers is calculated. Further, the bare metal servers having lowest memory usage are identified. Further, the system 102 calculates if the EVMs in the bare metal server with high resource utilization can be migrated to the bare metal servers having low memory usage by matching the resource requirements of the EVMs in the bare metal server with high resource utilization and the resource availability in the bare metal servers with low memory usage. If yes, then all the EVMs from the bare metal server having high resource utilization are migrated to the bare metal servers having low memory usage.

If not, the system 102 finds a bare metal server with low CPU usage. Then, the system 102 calculates if the EVMs in the bare metal server with high resource utilization can be transferred migrated to the bare metal servers with low CPU usage based on the resource requirement of the EVMs. If yes, the EVMs are migrated to the bare metal servers having low CPU usage.

Exemplary embodiments discussed above may provide certain advantages. Though not required to practice aspects of the disclosure, these advantages may include the following advantages.

Some embodiments of the system 102 and the method enable efficient utilization of cloud computing resources by monitoring the node performance. Thereby reducing the cost of cloud computing services required for an application.

Some embodiments of the system 102 and the method enable flexible and automatic workload allocation between elastic virtual machines and virtual machines using an admission controller.

Some embodiments of the system 102 and the method may prevent downtime of an application running on the cloud computing environment.

Some embodiments of the system 102 and the method enable compatibility check of the cloud environment before creating EVMs, ensuring a smooth deployment process.

Some embodiments of the system 102 and the method enable avoiding unnecessary resource allocation, the system 102 helps organizations save costs associated with overprovisioning.

Some embodiments of the system 102 and the method enable integration with cloud service provider APIs, streamlining resource management and provisioning.

Some embodiments of the system 102 and the method enable live migration of an EVM to another bare metal server ensuring the balance of workloads across the cloud infrastructure. Thus, the EVM may be moved to the bare metal server with lower resource utilization, optimizing resource allocation and ensuring that each EVM operates efficiently.

Although implementations for methods and system for managing workload of an application in a cloud computing environment have been described in language specific to structural features and/or methods, it is to be understood that the appended claims are not necessarily limited to the specific features or methods described. Rather, the specific features and methods are disclosed as examples of implementations for managing workload of an application.

We claim:

1. A method for managing workload of an application in a cloud computing environment, the method comprising:
    receiving, by a processor, cloud service data from an existing cloud infrastructure, wherein the existing cloud infrastructure (ECI) comprises a storage system, one or more bare metal servers, and a network interface, a storage interface, a cloud control manager, and one or more virtual machines (VMs);
    configuring, by the processor, the cloud control manager to connect an Elastic Machine Pool Infrastructure (EMPI) to the existing cloud infrastructure, wherein the cloud control manager is configured to communicate with the network interface and the storage interface to connect the EMPI to the ECI, and wherein the EMPI comprises an orchestrator;

receiving, by the processor, the workload from the application running on the cloud computing environment;

creating, by the processor, one or more Elastic Virtual Machines (EVMs) in an Elastic Machine Pool (EMP), using the orchestrator, based on the received workload;

allocating, by the processor, the workload to at least one of a VM and an EVM based on at least one of an EMP profile of the application, status of the VM, status of the EVM, and workload characteristics, wherein the EVM is hosted on one of the one or more bare metal servers; and managing, by the processor, the one or more bare metal servers and the one or more EVMs based on the workload characteristics, the status of the VM, node management data, and the status of the EVM, wherein the one or more bare metal servers and the one or more EVMs are managed using a machine learning algorithm, and wherein the machine learning algorithm is trained using the node management data.

2. The method as claimed in claim 1, wherein the cloud computing environment comprises the ECI and the EMPI, wherein the EMPI comprises an admission controller, an auto-scaler, and a rebalancer.

3. The method as claimed in claim 1, further comprising:
creating one or more pods based on the workload characteristics, wherein the one or more pods are used to deploy one or more processes of the application;
monitoring status of the one or more pods, status of the one or more EVMs, and status of the one or more VMs; and
allocating the one or more pods to the one or more EVMs based on at least one of the status of the one or more EVMs, the status of the one or more pods, one or more pod characteristics, and pod scheduling data.

4. The method as claimed in claim 3, wherein the one or more pod characteristics include at least one of number of pod replicas, a pod template, pod health, resource requirements, and container images.

5. The method as claimed in claim 3, wherein the pod scheduling data includes affinity rules, pod tolerations, and pod priorities.

6. The method as claimed in claim 3, wherein managing the one or more EVMs comprises:
monitoring the status of the one or more pods, the status of the one or more VMs, and the status of the one or more EVMs; and
creating a new EVM based on the status of the one or more pods, the status of the one or more VMs, and the status of the one or more EVMs.

7. The method as claimed in claim 6, wherein the new EVM is created based on the status of the one or more pods allocated to the one or more EVMs and the one or more pod characteristics of the one or more pods allocated to the one or more EVMs.

8. The method as claimed in claim 3, wherein the cloud control manager is configured to perform one or more activities comprising at least one of assigning a node address for the one or more EVMs, monitoring the status of the one or more pods allocated to the one or more EVMs, monitoring the status of the one or more VMs, and monitoring the status of the one or more EVMs.

9. The method as claimed in claim 1, wherein the EMP profile comprises a set of rules, wherein the set of rules are related to the workload characteristics, and wherein the workload characteristics include resource requirement of the workload and a source of the workload.

10. The method as claimed in claim 1, wherein the one or more bare metal servers and the one or more EVMs are managed by at least one of auto-scaling the one or more EVMs and rebalancing the one or more EVMs.

11. The method as claimed in claim 1, comprises recording the node management data including historic data of the EMPI including past workloads, number of EVMs, number of bare metal servers, data related to modifications in the EMP including auto-scaling the one or more EVMs and rebalancing the one or more EVMs.

12. The method as claimed in claim 1, wherein the cloud service data comprises a cloud service provider information and subscription information.

13. The method as claimed in claim 11, wherein rebalancing the one or more EVMs comprises at least one of creating new bare metal servers, migrating the one or more EVMs to the new bare metal servers, and resizing the one or more EVMs based on the workload characteristics, the status of the one or more pods and the status of the one or more EVMs.

14. The method as claimed in claim 13, comprises over-provisioning resources for the one or more EVMs based on at least historical workload data for predictively resizing the one or more EVMs, wherein the resources are overprovisioned on the one or more bare metal servers, and wherein the resources correspond to at least one of storage, memory, and processing power.

15. A system for managing workload of an application in a cloud computing environment, the system comprises:
a memory; and
a processor coupled to the memory, wherein the processor is configured to execute program instructions stored in the memory for:
receiving cloud service data from an existing cloud infrastructure, wherein the existing cloud infrastructure (ECI) comprises a storage system, one or more bare metal servers, and a network interface, a storage interface, a cloud control manager, and one or more virtual machines (VMs);
configuring the cloud control manager to connect an Elastic Machine Pool Infrastructure (EMPI) to the existing cloud infrastructure, wherein the cloud control manager is configured to communicate with the network interface and the storage interface to connect the EMPI to the ECI, and wherein the EMPI comprises an orchestrator;
receiving the workload from the application running on the cloud computing environment;
creating one or more Elastic Virtual Machines (EVMs) in an Elastic Machine Pool (EMP), based on the workload, by the orchestrator;
allocating the workload to at least one of a VM and an EVM based on at least one of an EMP profile of the application, status of the VM, status of the EVM, and workload characteristics, wherein the EVM is hosted on one of the one or more bare metal servers; and
managing the one or more bare metal servers and the one or more EVMs based on the workload characteristics, the status of the VM, node management data, and the status of the EVM, wherein the one or more bare metal servers and the one or more EVMs are managed using a machine learning algorithm, and wherein the machine learning algorithm is trained using the node management data.

16. A non-transitory computer program product having embodied thereon a computer program for managing workload of an application in a cloud computing environment, the non-transitory computer program product storing instructions for:

receiving cloud service data from an existing cloud infrastructure, wherein the existing cloud infrastructure (ECI) comprises a storage system, one or more bare metal servers, and a network interface, a storage interface, a cloud control manager, and one or more virtual machines (VMs);

configuring the cloud control manager to connect an Elastic Machine Pool Infrastructure (EMPI) to the existing cloud infrastructure, wherein the cloud control manager is configured to communicate with the network interface and the storage interface to connect the EMPI to the ECI, and wherein the EMPI comprises an orchestrator;

receiving the workload from the application running on the cloud computing environment;

creating one or more Elastic Virtual Machines (EVMs) in an Elastic Machine Pool (EMP), based on the workload, by the orchestrator;

allocating the workload to at least one of a VM and an EVM based on at least one of an EMP profile of the application, status of the VM, status of the EVM, and workload characteristics, wherein the EVM is hosted on one of the one or more bare metal servers; and managing the one or more bare metal servers and the one or more EVMs based on the workload characteristics, the status of the VM, node management data, and the status of the EVM, wherein the one or more bare metal servers and the one or more EVMs are managed using a machine learning algorithm, and wherein the machine learning algorithm is trained using the node management data.

* * * * *